(12) United States Patent
Zhan et al.

(10) Patent No.: US 10,282,039 B2
(45) Date of Patent: May 7, 2019

(54) DISPLAY SCREEN, TOUCH PEN AND DISPLAY MODULE UTILIZING ELECTROMAGNETIC SIGNAL AND SOUND WAVE SIGNAL

(71) Applicants: BOE Technology Group Co., Ltd., Beijing (CN); Hefei Xinsheng Optoelectronics Technology Co., Ltd., Anhui (CN)

(72) Inventors: Yifei Zhan, Beijing (CN); Dayu Zhang, Beijing (CN); Xinchen Ma, Beijing (CN)

(73) Assignees: BOE TECHNOLOGY GROUP CO., LTD., Beijing (CN); HEFEI XINSHENG OPTOELECTRONICS TECHNOLOGY CO., LTD., Anhui (CN)

( * ) Notice: Subject to any disclaimer, the term of this patent is extended or adjusted under 35 U.S.C. 154(b) by 47 days.

(21) Appl. No.: 15/520,930

(22) PCT Filed: Jun. 12, 2016

(86) PCT No.: PCT/CN2016/085435
§ 371 (c)(1),
(2) Date: Apr. 21, 2017

(87) PCT Pub. No.: WO2017/148041
PCT Pub. Date: Sep. 8, 2017

(65) Prior Publication Data
US 2018/0088696 A1    Mar. 29, 2018

(30) Foreign Application Priority Data

Mar. 1, 2016 (CN) .......................... 2016 1 0114667

(51) Int. Cl.
*G06F 3/033*        (2013.01)
*G06F 3/043*        (2006.01)
(Continued)

(52) U.S. Cl.
CPC .......... *G06F 3/043* (2013.01); *G06F 3/03545* (2013.01); *G06F 3/044* (2013.01);
(Continued)

(58) Field of Classification Search
CPC .... G06F 3/03545; G06F 3/0383; G06F 3/043; G06F 3/0412; G06F 3/0416; G06F 3/044
(Continued)

(56) References Cited

U.S. PATENT DOCUMENTS 7,279,646 B2    10/2007    Xu
8,537,141 B2    9/2013    Xu
(Continued)

FOREIGN PATENT DOCUMENTS

CN    1531706 A    9/2004
CN    101042625 A    9/2007
(Continued)

OTHER PUBLICATIONS

First Office Action, for Chinese Patent Application No. 201610114667.3, dated Feb. 11, 2018, 15 pages.
(Continued)

*Primary Examiner* — Adam J Snyder
(74) *Attorney, Agent, or Firm* — Westman, Champlin & Koehler, P.A.

(57) ABSTRACT

A display screen, a touch pen and a display module are disclosed. The display screen includes a frame, a touch display panel, a controller and a plurality of sound wave detectors; the plurality of sound wave detectors are disposed at different positions on the frame and at the same side of frame as an operating surface of the touch display panel.

(Continued)

Sound wave detector detects sound wave signals sent by sound wave emission sources and sends the detected sound wave signals to the controller; the touch display panel detects electromagnetic signals sent by electromagnetic generators and sends them to the controller; the controller determines actual touch positions of a plurality of touch pens on the touch display panel based on the electromagnetic signals and sound wave signals emitted by sound wave emission sources of the touch pens to achieve accurate positioning.

14 Claims, 1 Drawing Sheet

(51) Int. Cl.
  G06F 3/0354 (2013.01)
  G06F 3/041 (2006.01)
  G06F 3/044 (2006.01)
(52) U.S. Cl.
  CPC .......... *G06F 3/0412* (2013.01); *G06F 3/0416* (2013.01); *G06F 2203/04104* (2013.01); *G06F 2203/04106* (2013.01)
(58) Field of Classification Search
  USPC ........................................ 345/179; 178/19.02
  See application file for complete search history.

(56) References Cited

U.S. PATENT DOCUMENTS

| | | | |
|---|---|---|---|
| 8,547,363 B2 | 10/2013 | Xu | |
| 8,576,202 B2 | 11/2013 | Tanaka et al. | |
| 8,970,561 B2 | 3/2015 | Xu | |
| 9,304,611 B2 | 4/2016 | Ding et al. | |
| 9,552,106 B2 | 1/2017 | Tanaka et al. | |
| 2001/0000666 A1* | 5/2001 | Wood | G06F 3/03545 345/179 |
| 2002/0050983 A1* | 5/2002 | Liu | G06F 3/03545 345/173 |
| 2002/0176577 A1* | 11/2002 | Xu | G06F 3/0346 380/258 |
| 2003/0071798 A1 | 4/2003 | Baron et al. | |
| 2004/0032399 A1* | 2/2004 | Sekiguchi | G06F 3/03545 345/173 |
| 2004/0080498 A1* | 4/2004 | Fujiwara | G06F 3/03545 345/179 |
| 2004/0160429 A1* | 8/2004 | Blake | G06F 3/03545 345/179 |
| 2004/0201580 A1* | 10/2004 | Fujiwara | G06F 3/03545 345/179 |
| 2007/0242059 A1 | 10/2007 | Xu | |
| 2008/0048988 A1* | 2/2008 | Qi | G06F 3/03545 345/173 |
| 2008/0129709 A1* | 6/2008 | Lin | G06F 3/03545 345/179 |
| 2008/0169132 A1 | 7/2008 | Ding et al. | |
| 2011/0090182 A1 | 4/2011 | Xu | |
| 2011/0205191 A1 | 8/2011 | Hou et al. | |
| 2012/0113753 A1* | 5/2012 | Miyamoto | G01S 5/30 367/100 |
| 2012/0194486 A1* | 8/2012 | Kajitani | G06F 3/03545 345/179 |
| 2012/0206417 A1* | 8/2012 | Lee | G06F 3/03545 345/177 |
| 2014/0010453 A1 | 1/2014 | Xu | |
| 2014/0085234 A1 | 3/2014 | Kawai | |
| 2014/0225875 A1 | 8/2014 | Ding et al. | |
| 2014/0247235 A1 | 9/2014 | Lee | |
| 2015/0002415 A1 | 1/2015 | Lee et al. | |
| 2015/0138123 A1* | 5/2015 | Yoon | G06F 3/0433 345/173 |
| 2017/0010755 A1 | 1/2017 | Tanaka et al. | |

FOREIGN PATENT DOCUMENTS

| | | |
|---|---|---|
| CN | 101578568 A | 11/2009 |
| CN | 101685366 A | 3/2010 |
| CN | 201590049 U | 9/2010 |
| CN | 101968700 A | 2/2011 |
| CN | 101976158 A | 2/2011 |
| CN | 103889263 A | 6/2014 |
| CN | 103930855 A | 7/2014 |
| CN | 105278794 A | 1/2016 |
| JP | 2009032127 A | 2/2009 |
| TW | 201203056 A1 | 1/2012 |

OTHER PUBLICATIONS

International Search Report and Written Opinion, including English translation of Box No. V of the Written Opinion, for International Application No. PCT/CN2016/085435, dated Nov. 9, 2016, 13 pages.

* cited by examiner

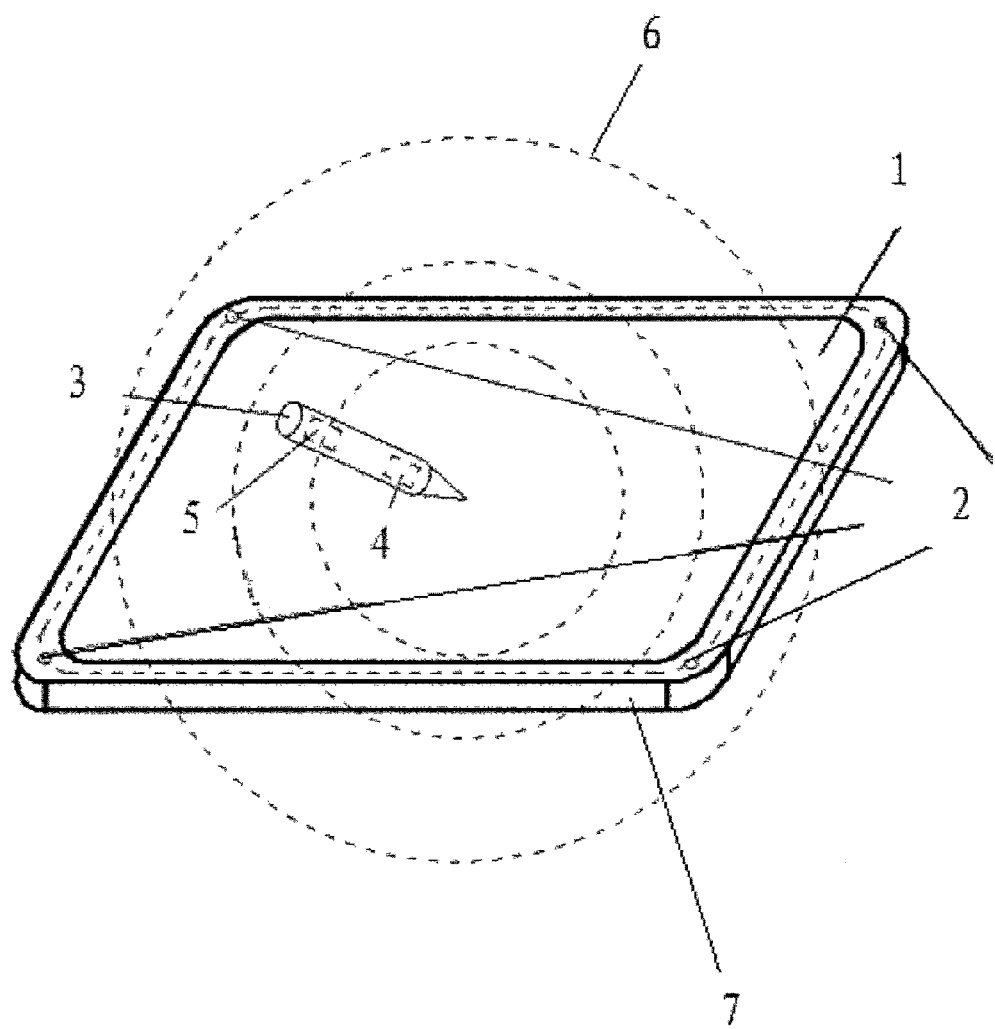

DISPLAY SCREEN, TOUCH PEN AND DISPLAY MODULE UTILIZING ELECTROMAGNETIC SIGNAL AND SOUND WAVE SIGNAL

CROSS REFERENCE TO RELATED APPLICATIONS

This application is a Section 371 National Stage Application of International Application No. PCT/CN2016/085435, filed on 12 Jun. 2016, entitled "DISPLAY SCREEN, TOUCH PEN AND DISPLAY MODULE", which claims priority to Chinese Application No. 201610114667.3, filed on 1 Mar. 2016, incorporated herein by reference in its entirety.

TECHNICAL FIELD

The present disclosure relates to the field of display technology, and especially, to a display screen, a touch pen and a display module in which the display screen and the touch pen are utilized.

BACKGROUND

As a new type of man-machine interactive device, a touch screen is the most simple and convenient medium for user to achieve man-machine interaction currently. In current market of touch screen products, capacitive touch screens are widely used due to high sensitivity and good man-machine interactivity. With the development of technologies of capacitive touch screens and increasing demand of people's consumption, active capacitive pen and capacitive touch screen that support pressure sensing operation have been developed. However, due to technical limitation of exiting active capacitive pens, when they are used, report rate of them is insufficient and pseudo point(s) may occur, which result in low accuracy. Moreover, exiting capacitive touch screens that support pressure sensing operation do not support simultaneous operations of a plurality of active pens, and multipoint positioning cannot be realized. Thus, convenience of such touch screens is decreased, and development and applications of such touch screens are limited.

Further, there is touch control devices using sound waves in related art, such as TW 201203056A, which discloses a sound wave touch control device having no seating plate. An operation principle of touch control using sound wave in this disclosure is to perform coordinate recognition based on obstruct to a normal distribution of sound wave by an object (such as a finger and the like). However, such sound wave utilization technology also involves a problem of poor positioning accuracy.

SUMMARY OF THE INVENTION

An object of the present disclosure is to improve positioning accuracy of a touch screen. Another object of the present disclosure is to achieve multipoint positioning of a touch screen.

In order to solve the above technical problem, in a first aspect of the present disclosure, there is provided a display screen, which comprises a frame, a touch display panel, a controller and a plurality of sound wave detectors, the plurality of sound wave detectors being disposed at different positions on the frame and at the same side of the frame as an operating surface of the touch display panel;

each of the sound wave detectors is configured to detect a sound wave signal sent by a sound wave emission source of each of a plurality of touch pens and send the detected sound wave signal to the controller, and the sound wave signals emitted by the sound wave emission sources of the plurality of touch pens have different frequency bands from each other;

the touch display panel is configured to detect an electromagnetic signal sent by an electromagnetic generator of each of the plurality of touch pens and send the detected electromagnetic signal to the controller; and the controller is configured to: determine a set of positions for each touch pen, including actual touch positions and pseudo points of the touch pen on the touch display panel based on received electromagnetic signals; determine, based on sound wave signals in each frequency band, a range of touch position for the touch pen, which emits the sound wave signals in the frequency band, on the touch display panel; and determine actual touch positions of the touch pens on the touch display panel by screening positions from the set of positions based on the range of touch positions;

or, the controller is configured to: determine, based on sound wave signals in each frequency band, a range of touch position for the touch pen, which emits the sound wave signals in the frequency band, on the touch display panel; and determine a touch position of each of the plurality of touch pens in its corresponding range of touch position based on received electromagnetic signals as the actual touch position of the touch pen.

Further, the controller may be further configured to control the touch display panel to display the determined actual touch positions, after determining the actual touch position of each of the plurality of the touch pens on the touch display panel.

Further, the controller may be further configured to determine a pressure applied by each of the touch pens based on a frequency of the electromagnetic signal emitted by the electromagnetic generator in the touch pen.

Further, the controller may be further configured to determine a pressure applied by each of the touch pens based on a frequency of the sound wave signal emitted by the sound wave emission source in the touch pen.

Further, the controller may be further configured to control display of the touch display panel based on the determined pressure.

Further, the touch display panel may be a capacitive touch panel, and in this case, the touch display panel may be further configured to detect a finger touch signal generated by a finger on the touch display panel and send the detected finger touch signal to the controller, and the controller is configured to determine a touch position of the finger on the touch display panel based on the finger touch signal detected by the touch display panel.

Further, determining, by the controller, the range of touch position for each of the touch pens on the touch display panel based on the received sound wave signal may include determining the range of touch position for each touch pen on the touch display panel based on differences in time at which the sound waves are received by the plurality of sound wave detectors.

According to a second aspect of the present disclosure, there is provided a touch pen, which comprises:

a pen body;

a pressure sensor disposed at one end of the pen body and configured to determine whether the touch pen is pressed on a touch display panel;

an electromagnetic generator connected with the pressure sensor and disposed inside the pen body, the electromagnetic generator being configured to emit an electromagnetic signal if the pressure sensor detects that the touch pen is pressed on the touch display panel; and a sound wave emission source disposed inside the pen body and configured to emit a sound wave signal.

Further, the sound wave emission source may be further connected with the pressure sensor and configured to emit the sound wave signal if the pressure sensor detects that the touch pen is pressed on the touch display panel.

Further, the pressure sensor may be further configured to detect a pressure value by which the touch pen is pressed on the touch display panel, and the electromagnetic generator is further configured to generate the electromagnetic signal having an electromagnetic frequency corresponding to the pressure value based on the pressure value detected by the pressure sensor.

Further, the pressure sensor may be further configured to detect a pressure value by which the touch pen is pressed on the touch display panel, and the sound wave emission source is configured to generate a sound wave signal having a sound wave frequency corresponding to the pressure value based on the pressure value detected by the pressure sensor.

Further, according to an embodiment of the present disclosure, the touch pen may further include a manually adjustable switch connected to the sound wave emission source and configured to set a frequency band of the sound wave emission source.

In a third aspect, according to an embodiment of the present disclosure, there is provided a display module, which includes the above described display screen and the above described touch pen.

Preferably, the display module may include a plurality of touch pens, each of which is the above described touch pen, and frequency bands of sound wave signals emitted by sound wave emission sources of the plurality of touch pens are different from each other.

The present disclosure provides a display screen, a touch pen and a display module utilizing the display screen and the touch pen. Sound wave detectors are provided in the display screen to detect sound wave signals sent by sound wave emission sources in each one of a plurality of touch pens and send the detected sound wave signals to the controller; the touch display panel is configured to detect electromagnetic signals sent by electromagnetic generators in each one of the plurality of touch pens and send the detected electromagnetic signals to the controller; the controller may achieve accurate positioning of the touch pens based on the electromagnetic signals and may determine an approximate positions of the touch pens based on the sound wave signals emitted by the sound wave emission sources of the touch pens, such that pseudo points can be removed; by setting each touch pen to have a different frequency band, an actual touch position of each touch pen on the display screen may be detected simultaneously. In such a manner, an aim of accurate positioning may be realized, and at the same time, the disclosure may realize recognition and accurate positioning of different active touch pens based on different frequency bands of sound wave signals corresponding to respective touch pens.

BRIEF DESCRIPTION OF THE DRAWINGS

In order to clear explain the technical solutions according to embodiments of present disclosure or prior art, the appended drawings used to describe the technical solutions will be briefly introduced. Obviously, the following drawings only illustrate a part of embodiments of the present disclosure, and drawings for other embodiments can be obtained based on the following drawings without any creative work.

FIG. 1 is a structural schematic view of a display module according to an embodiment of the present disclosure.

DETAILED DESCRIPTION OF PREFERRED EMBODIMENTS

The present disclosure will be described hereinafter in detail with reference to the attached drawings and embodiments. The embodiments are provided to explain the disclosure instead of limiting the same.

According to an embodiment of the disclosure, there is provided a display screen, which includes: a frame 7, a touch display panel 1, a controller (which is not shown but, for example, may be provided inside of the touch display panel 1) and four sound wave detectors 2. The four sound wave detectors 2 are provided at four corners of the frame 7, respectively, and at the same side of the frame as an operating surface of the touch display panel 1, as show in FIG. 1. Each sound wave detector 2 is configured to detect a sound wave signal sent by a sound wave emission source of each touch pen of a plurality of touch pens and send the detected sound wave signal to the controller. The touch display panel 1 is configured to detect electromagnetic signal sent by an electromagnetic generator of each touch pen of a plurality of touch pens and send the detected electromagnetic signal to the controller.

The controller may be configured in one of the following manners.

In a first manner, the controller is configured to determine a position set for each of the touch pens based on electromagnetic signals it receives, and the position set includes actual touch positions of the touch pens on the touch display panel and pseudo points positions; when the sound wave signals 6 emitted by the sound wave emission sources of the plurality of touch pens have different frequency bands from each other, the controller is further configured to determine a range of touch position for each of the touch pens on the touch display panel based on the received sound wave signals 6; and finally, the controller is further configured to determine actual touch positions of the touch pens on the touch display panel by screening positions from the position set using the range of touch positions.

In this configuration, the display screen may perform positioning by utilizing electromagnetic signals and remove the pseudo points by utilizing the sound wave signals, so that an accurate positioning may be achieved. At the same time, the display screen may recognize different active touch pens based on different frequency bands of the sound wave signals emitted by the sound wave emission sources of the touch pens. In such a manner, the display screen may support simultaneous operations of a plurality of active touch pens and may realize an accurate positioning for a plurality of points. Additionally, the display screen may realize touch control of active touch pens by utilizing a sound wave, which substantially does not involve electromagnetic interference with the display screen, and may help to increase point report rate and thereby increase accuracy of positioning.

In a second manner, when sound wave signals emitted by the sound wave emission sources of the touch pens have different frequency bands from each other, the controller is configured to determine a range of touch position for each touch pen on the touch display panel based on a sound wave signal 6 emitted by the touch pen; and the controller is further configured to determine a touch position of each touch pen in its corresponding range of touch position based on the received electromagnetic signals and determine the determined touch position as the actual touch position of the touch pen.

In this configuration, the display screen may firstly utilize sound wave signals to determine an approximate range of position for each touch pen, then determine a position of each touch pen within the range of position based on received electromagnetic signals, and in this circumstance, the determined position may be considered as an actual touch position. In such a manner, a multipoint touch control and accurate positioning may also be achieved.

When implemented, the controller being configured to determine a range of touch position for each touch pen on the touch display panel based on a sound wave signal 6 emitted by the touch pen may include the controller being configured to achieve a coarse positioning based on differences in time at which the sound waves are received respectively by the four sound wave detectors 2 and determine a range of position on the touch display panel for each touch pen.

As a first optional configuration of the display screen, the controller may be also configured to control the touch display panel to display the determined actual touch positions, after having determined the actual touch positions of the touch pens on the touch display panel. With such an operation mode, a user may conveniently determine whether the actual touch positions are right, so as to provide a visualized verification on positioning accuracy of the display screen.

As a second optional configuration of the display screen, the controller may be configured to determine a pressing strength of a touch pen based on a frequency of an electromagnetic signal emitted by an electromagnetic generator in the touch pen, then control the display screen to display an image of a corresponding mode based on corresponding data (i.e., control instruction) generated according to the pressing strength. For example, the controller may generate a corresponding control instruction based on an electromagnetic signal it receives such that the display screen may be controlled to display thick or fine lines corresponding to the frequency of the received electromagnetic signal. Of course, other aspects of a displayed image may also be controlled based on the frequency of the received electromagnetic signal, such as color, darkness and the like. Aspects of the displayed image that are controlled based on the electromagnetic signal are not specifically limited herein.

As a third optional configuration of the display screen, the controller may be configured to determine a pressing strength of a touch pen based on a frequency of a sound wave signal emitted by a sound wave emission source in the touch pen, and then control the display mode of the image based on the frequency of the sound wave signal. A principle of the control based on the frequency of the sound wave signal is substantially the same as that of the control based on the frequency of the electromagnetic signal, and will not be repeated herein.

As a fourth optional configuration of the display screen, the touch display panel may be a capacitive touch panel, which may detect a finger touch signal generated by a finger on the touch display panel and send the detected finger touch signal to the controller. At the same time, the controller is configured to determine a touch position of the finger on the touch display panel based on the finger touch signal detected by the touch display panel. Using a capacitive touch panel as the touch display panel may enable the display screen according to the present disclosure to have touch control functions with a touch pen and have touch control functions with a finger at the same time, therefore, if the touch pen is broken or damaged, the display screen may be controlled directly by the finger, such that operation of the display screen will not be affected if the touch pen is damaged, thus the display screen is more convenient for use and user experience can be efficiently improved.

It can be understood that, when implemented, the display screen may be set according to all of the above four configurations, and of course, it can be set according to only one or more of the four configurations.

It can be understood that, although the embodiment of the present disclosure is described by an example in which the number of the sound wave detectors is four and they are disposed at four corners of the frame, the number of the sound wave detectors may not be limited to four in practice, for example, the coarse positioning may be achieved by three or more than four sound wave detectors. Moreover, in order to achieve the coarse positioning, it is not necessary to dispose the sound wave detectors at the four corners of the frame. As long as coarse positioning of touch pens can be achieved, the implantation of the present disclosure is not affected by configuration of specific positions of the sound wave detectors, and thus, positions of the sound wave detectors on the frame are not specifically defined herein.

According to another aspect of the present disclosure, there is provided a touch pen, which may be used with the display screen shown in FIG. 1 to realize a touch control function. The touch pen may perform touch control on the display screen. The touch pen includes a pen body 3, a pressure sensor 4 disposed at one end of the pen body 3, an electromagnetic generator (not shown) and a sound wave emission source 5, wherein the electromagnetic generator is connected with the pressure sensor, and both the electromagnetic generator and the pressure sensor are disposed inside the pen body 3. The sound wave emission source 5 is also disposed inside the pen body 3.

The pressure sensor 4 is configured to determine whether the touch pen is pressed on the touch display panel, detect a pressure value when it is determined that the touch pen is pressed on the touch display panel, and send the detected pressure value to the electromagnetic generator, which emits electromagnetic signal having a corresponding frequency based on the pressure value.

The sound wave emission source 5 is configured to emit the sound wave signal 6, and the sound wave signal 6 is then received and sent by the sound wave detectors of the display screen to the controller, such that the controller may determine the range of position of the touch pen based on the sound wave signal. With the cooperation of the touch pen and the display screen, the electromagnetic signal is utilized for positioning and the sound wave signal is utilized to remove pseudo points, so that an accurate positioning can be achieved. Additionally, sound wave emission sources 5 of different touch pens are configured to emit sound waves of different high frequency bands such that the controller of the display may recognize different active touch pens based on the different frequency bands, thereby the display screen can support simultaneous operations performed by a plurality of active touch pens and realize accurate multipoint positioning. Moreover, when the plurality of touch pens operations simultaneously, they do not interfere with each other and accuracy of positioning is not degraded, as each touch pen emits sound wave of a frequency band different from others.

As a first optional configuration of the touch pen, the sound wave emission source may further be connected with the pressure sensor; the pressure sensor 4 is configured to detect whether the touch pen is pressed on the touch display panel, detect a pressure value when the touch pen is pressed on the touch display panel, and send the detected pressure value to the sound wave emission source, which emits a sound wave signal having a corresponding frequency based on the pressure value. In such a manner, after receiving a sound wave signal sent by a certain touch pen, the controller can determine a pressure applied by the touch pen on the display screen based on the frequency of the sound wave signal. Of course, when the present disclosure is implemented with a plurality of touch pens being utilized to perform a touch control, in order to avoid interference on detection of the touch control of one touch pen from other touch pens, a frequency of sound wave signal emitted by each touch pen is usually limited to change within a corresponding frequency band of the sound wave signal.

As a second optional configuration of the touch pen, the touch pen may further include a manually adjustable switch (not shown), which is connected to the sound wave emission source 5 and configured to set the frequency band of the sound wave emission source. In such a manner, each touch pen may emit a sound wave signal of various frequency band, and, through setting sound wave signals of different frequency bands for a plurality of different touch pens, these touch pens may perform touch controls on the same display screen.

In practice, a touch pen may be configured according to both of above two configurations, or any one of them.

According to the above introduction, frequencies of electromagnetic signal and sound wave signal may be slightly adjusted to realize encoding and transmission of a sensed pressure value, such that it is not necessary to specifically insert a blanking time before each frame to perform information interaction (i.e., information interaction concerning the pressure value), and refresh rate of touch control may be increased.

The present disclosure also relates to a display module, which includes the above described display screen and the above described touch pen. The display module may further include a plurality of touch pens, and frequency bands of sound wave signals emitted respectively by sound wave emission sources of these touch pens are different from each other. If the display screen is a capacitive touch screen, its operation modes may be switched as follows: when an operator operates with fingers, the capacitive touch screen operates; when an operating state switch of the touch pen is turned on and the touch pen is close to the capacitive touch screen, the sound wave detector operates, and the controller realize a positioning function based on differences in times at which sound waves are received by the sound wave detector 2. From the above description, the display module can realize an accurate positioning of a touch and can realize an accurate multipoint positioning.

The embodiment set forth above should not be interpreted as a limitation to but an exemplary description of technical solutions of the disclosure. Although exemplary embodiments have been shown and described, it would be appreciated by those skilled in the art that various changes or modifications to some or all its technical features may be made in these embodiments without departing from the principles and spirit of the disclosure, and such changes or modifications shall fall within the scope of the description and claims of the present disclosure.

What is claimed is:

1. A display screen, comprising a frame, a touch display panel, a controller and a plurality of sound wave detectors, the plurality of sound wave detectors being disposed at different positions on the frame and at the same side of the frame as an operating surface of the touch display panel;
wherein each of the sound wave detectors is configured to detect a sound wave signal sent by a sound wave emission source of each of a plurality of touch pens and send the detected sound wave signal to the controller, and the sound wave signals emitted by the sound wave emission sources of the plurality of touch pens have different frequency bands from each other;
wherein the touch display panel is configured to detect an electromagnetic signal sent by an electromagnetic generator of each of the plurality of touch pens and send the detected electromagnetic signal to the controller;
wherein the controller is configured to: determine a set of positions for each touch pen, including actual touch positions and pseudo points of the touch pen on the touch display panel based on received electromagnetic signals determine, based on sound wave signals in each frequency band, a range of touch position for the each touch pen, which emits the sound wave signals in the frequency band, on the touch display panel; and then removing the pseudo points by utilizing the range of touch position to determine actual touch positions of the touch pens on the touch display panel; or
the controller is configured to: determine, based on sound wave signals in each frequency band, a range of touch position for each touch pen, which emits the sound wave signals in the frequency band, on the touch display panel, to achieve a coarse positioning for the each touch pen; and then determine a touch position of the touch pen in its corresponding range of touch position based on received electromagnetic signals as the actual touch position of the touch pen.

2. The display screen according to claim 1, wherein the controller is further configured to control the touch display panel to display the determined actual touch positions, after determining the actual touch position of each of the plurality of the touch pens on the touch display panel.

3. The display screen according to claim 1, wherein the controller is further configured to determine a pressure applied by each of the touch pens based on a frequency of the electromagnetic signal emitted by the electromagnetic generator in the touch pen.

4. The display screen according to claim 3, wherein the controller is further configured to control display of the touch display panel based on the determined pressure.

5. The display screen according to claim 3, wherein the controller is further configured to control display of the touch display panel based on the determined pressure.

6. The display screen according to claim 1, wherein the controller is further configured to determine a pressure applied by each of the touch pens based on a frequency of the sound wave signal emitted by the sound wave emission source in the touch pen.

7. The display screen according to claim 1, wherein the touch display panel is a capacitive touch panel.

8. The display screen according to claim 7, wherein touch display panel is further configured to detect a finger touch signal generated by a finger on the touch display panel and send the detected finger touch signal to the controller, and the controller is configured to determine a touch position of the finger on the touch display panel based on the finger touch signal detected by the touch display panel.

9. The display screen according to claim 1, wherein the controller is further configured to determine the range of touch position for each touch pen on the touch display panel based on differences in time at which the sound waves are received by the plurality of sound wave detectors.

10. A display module, comprising the display screen according to claim 1; and
at least one touch pen, the touch pen comprising:
a pen body;
a pressure sensor disposed at one end of the en body and configured to determine whether the touch pen is pressed on a touch display panel;
an electromagnetic generator connected with the pressure sensor and disposed inside the pen body, the electromagnetic generator being configured to emit an electromagnetic signal if the pressure sensor detects that the touch pen is pressed on the touch display panel; and
a sound wave emission source disposed inside the pen body and configured to emit a sound wave signal.

11. The display module according to claim 10, wherein the display module comprises a plurality of the touch pens, wherein frequency bands of sound wave signals emitted by sound wave emission sources of the plurality of touch pens are different from each other.

12. A touch pen, comprising:
a pen body;
a pressure sensor disposed at one end of the pen body and configured to determine whether the touch pen is pressed on a touch display panel;
an electromagnetic generator connected with the pressure sensor and disposed inside the pen body, the electromagnetic generator being configured to emit an electromagnetic signal if the pressure sensor detects that the touch pen is pressed on the touch display panel; and
a sound wave emission source disposed inside the pen body and configured to emit a sound wave signal,
wherein the sound wave emission source is further connected with the pressure sensor and configured to emit the sound wave signal if the pressure sensor detects that the touch pen is pressed on the touch display panel,
the pressure sensor is further configured to detect a pressure value by which the touch pen is pressed on the touch display panel, and
the sound wave emission source is configured to generate a sound wave signal having a sound wave frequency corresponding to the pressure value based on the pressure value detected by the pressure sensor.

13. The touch pen according to claim 12, wherein
the electromagnetic generator is further configured to generate the electromagnetic signal having an electromagnetic frequency corresponding to the pressure value based on the pressure value detected by the pressure sensor.

14. The touch pen according to claim 12, further comprising a manually adjustable switch connected to the sound wave emission source and configured to set a frequency band of the sound wave emission source.

* * * * *